United States Patent [19]

Harasaki

[11] Patent Number: 4,717,197
[45] Date of Patent: Jan. 5, 1988

[54] AUTOMOBILE BODY SIDE STRUCTURE

[75] Inventor: Hayatsugu Harasaki, Hiroshima, Japan

[73] Assignee: Mazda Motor Corporation, Hiroshima, Japan

[21] Appl. No.: 844,975

[22] Filed: Mar. 27, 1986

[30] Foreign Application Priority Data

Mar. 30, 1985 [JP] Japan .................................. 60-68056
Mar. 30, 1985 [JP] Japan .................................. 60-68057

[51] Int. Cl.4 .............................................. B62D 2/04
[52] U.S. Cl. .................................. 296/187; 296/191; 296/195; 296/202
[58] Field of Search ............... 296/185, 187, 191, 193, 296/194, 195, 197, 198, 199, 201, 202, 209, 29, 30

[56] References Cited

U.S. PATENT DOCUMENTS

| | | | |
|---|---|---|---|
| 2,474,992 | 7/1949 | Stephenson et al. | 296/195 |
| 3,697,124 | 10/1972 | Wessells | 296/185 |
| 3,776,589 | 12/1973 | Barenyi et al. | 296/187 |
| 3,883,171 | 5/1975 | Bauer | 296/188 |
| 4,234,225 | 11/1980 | Harasaki et al. | 296/185 |
| 4,252,364 | 2/1981 | Toyama et al. | |
| 4,294,487 | 10/1981 | Nakamura | 296/188 |
| 4,304,434 | 12/1981 | Suzuki et al. | 296/195 |
| 4,471,992 | 9/1984 | Matsuura et al. | 296/195 X |
| 4,552,400 | 12/1985 | Harasaki et al. | 296/185 |

FOREIGN PATENT DOCUMENTS 0084267 5/1982 Japan .................................. 296/187
0026678 2/1983 Japan .................................. 296/195

Primary Examiner—Robert B. Reeves
Assistant Examiner—Russell D. Stormer
Attorney, Agent, or Firm—Fleit, Jacobson, Cohn & Price

[57] ABSTRACT

An automobile body side structure including a front side outer panel and a rear side outer panel. The front side outer panel defines a side door opening and formed with a rear pillar reinforcement at the rear end of the side door opening. The rear side outer panel includes a rear fender outer panel section and a rear pillar outer panel section formed at the front edge portion of the rear fender outer panel section. A rear pillar inner panel is welded to the rear pillar outer panel section at the front and rear edge portions with the rear pillar reinforcement panel section interposed therebetween to form a rear pillar of a closed cross-section.

6 Claims, 12 Drawing Figures

AUTOMOBILE BODY SIDE STRUCTURE

BACKGROUND OF THE INVENTION

1. Field of the Invention

The present invention relates to automobile body structures and more particularly to side structures of automobile bodies.

2. Description of the Prior Art

Side structures of automobile bodies are generally composed of several sub-divided panels which are connected together by for example spot weldings to form a complete side structure. It has been recognized that, where the number of sub-divided panels is large, there will be an accumulation of manufacturing errors so that difficulties will be encountered in assembling the body side structure.

In the U.S. Pat. No. 4,252,364, there is disclosed an automobile body side structure wherein the outer panel is composed of a front side outer panel section and a rear side outer panel section. At the junction between the panel sections, the rear side outer panel section is formed with a substantially vertically extending pillar outer panel whereas the front side outer panel section is formed with a pillar inner panel. The pillar outer panel of the rear side outer panel section is connected at the front and rear edge portions with the pillar inner panel of the front side outer panel section to thereby form a pillar structure of a closed cross-section. The proposed structure is advantageous in that the body side outer panel can be formed with a smaller number of panel sections so that accumulation of manufacturing errors can be avoided. Inner panel sections can be located taking reference to the thus accurately assembled outer panel so that the overall assembling accuracy can be maintained.

In order to provide the pillar structure formed by the front and rear outer panel sections with sufficient rigidity, the U.S. patent further proposes to provide a pillar reinforcement which is located between the pillar outer panel on the rear side outer panel section and the pillar inner panel on the front side outer panel section. It should however be noted that the pillar reinforcement increases the number of parts which are to be assembled and therefore makes the assembling operation complicated.

SUMMARY OF THE INVENTION

It is therefore an object of the present invention to provide an automobile body side structure which has a smaller number of panel sections but possesses a satisfactory rigidity and strength.

Another object of the present invention is to provide an automobile body side structure having a pillar which is sufficiently reinforced without any specifically provided reinforcement panel.

Still further object of the present invention is to provide an automobile body side structure in which the side outer panel is divided into a front side outer panel section and a rear side outer panel section, one of which is integrally provided with a pillar outer panel section, the other being integrally provided with a pillar reinforcement which is adapted to be placed between the pillar outer panel section and a pillar inner panel.

According to the present invention, the above and other objects can be accomplished by an automobile body side panel assembly including a front side outer panel and a rear side outer panel, said front side outer panel including a front pillar outer panel section having an upper end contiguous with a front end of a roof rail outer panel section and a lower end contiguous with an upper end of a front door hinge pillar panel section, a side sill outer panel section having a front end contiguous with a lower end of said front door hinge pillar panel section, said roof rail outer panel section and said side sill outer panel section having rear ends contiguous with a substantially vertically extending first pillar panel section, said rear side outer panel including a rear fender outer panel section having a front end portion contiguous with a substantially vertically extending second pillar panel section, one of said first and second pillar panel sections being located outside the other, a pillar inner panel being connected to said first and second pillar sections to form a pillar of a closed cross-section with said one pillar panel section providing a pillar outer panel and said other pillar panel section providing a pillar reinforcement.

According to a preferable aspect of the present invention, the second pillar panel section provides the pillar outer panel and the first pillar panel section provides the pillar reinforcement. According to another aspect of the present invention, the front side outer panel is formed integrally with a rearward extension which extends rearward from said first pillar panel section to provide a rear fender inner panel section which is located laterally inside the rear fender outer panel section of the rear side outer panel.

The above and other objects and features of the present invention will become apparent from the following descriptions of preferred embodiments taking reference to the accompanying drawings.

DESCRIPTION OF THE PREFERRED EMBODIMENTS

Figure 1:
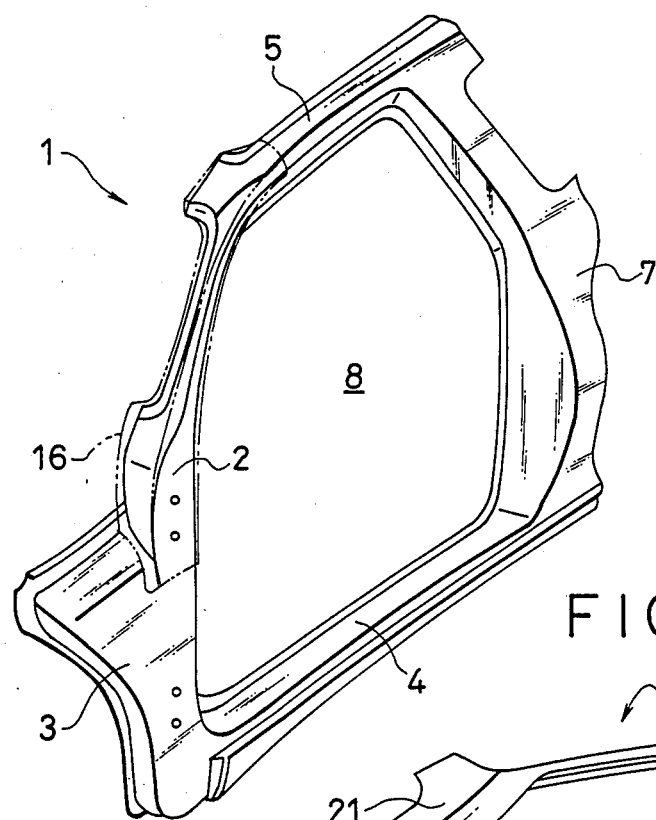
FIG. 1 is a perspective view of a front side outer panel in accordance with one embodiment of the present invention.

Referring now to the drawings, particularly to FIG. 1, there is shown a front side outer panel 1 which includes a substantially vertically extending front pillar outer panel section 2 and a front hinge pillar section 3 which is contiguous with the lower end of the section 2. There is a side sill outer panel section 4 which is integrally formed with the lower end of the front hinge pillar section 3 to extend rearward from the section 3. The upper end of the front pillar outer panel section 2 is contiguous with a front roof rail outer panel section 5 which extends rearward from the section 5. A rear pillar reinforcement 7 is integrally formed with the panel sections 4 and 5 and extends substantially vertically. It will be understood that a door opening 8 is defined by the panel sections 2 through 7. In order to reinforce the front pillar outer panel section 2, a reinforcement panel 16 may be attached to the outer side of the panel section 2 as shown by phantom lines in FIG. 1.

Figure 2:
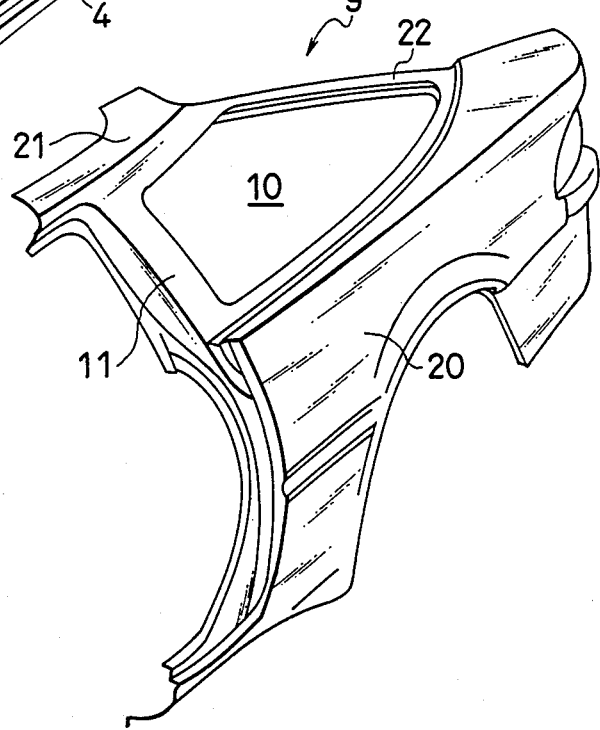
FIG. 2 is a perspective view of a rear side outer panel which is to be connected with the front side outer panel shown in FIG. 1 to provide a side outerpanel assembly.

Referring now to FIG. 2, there is shown a rear side outer panel 9 which includes a rear fender panel section 20. The front end portion of the rear fender panel section 20 is contiguous with a rear pillar outer panel section 11 which extends substantially vertically. The panel 9 includes a rear roof rail outer panel section 21 which is contiguous with the upper end of the rear pillar outer panel section 11 and extends substantially horizontally. The rear end of the rear roof rail outer panel section 21 is integrally connected with the rear end of the rear fender panel section 20 through a rear window frame outer panel section 22. It will therefore be understood that a rear window opening 10 is defined in the panel 9.

Figure 5:
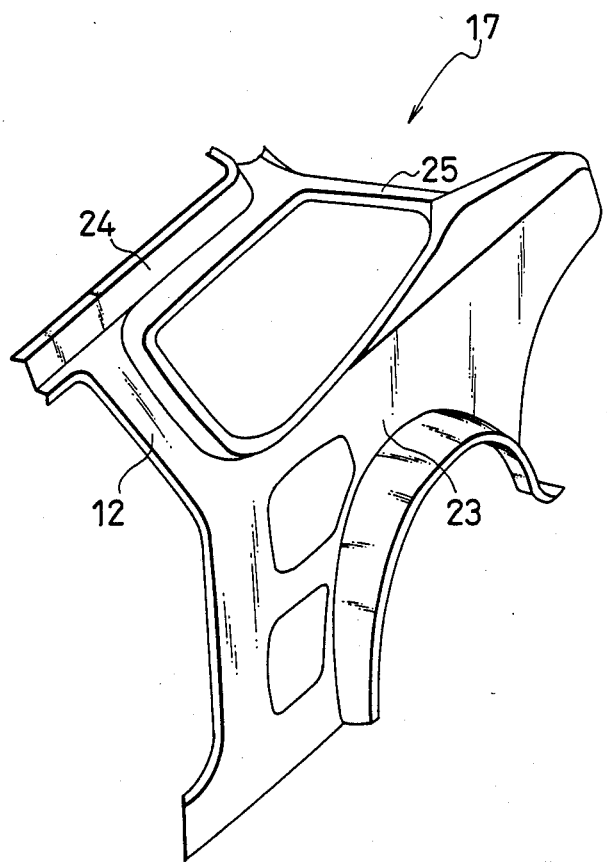
FIG. 5 is a perspective view of a rear side inner panel which is to be connected to the inside of the rear side outer panel.

Referring to FIG. 5, there is shown a rear side inner panel 17 which includes a rear fender inner panel section 23 having a front end portion contiguous with a rear pillar inner panel section 12. The upper end of the rear pillar inner panel section 12 is contiguous with a substantially horizontally extending rear roof rail inner panel section 24 which has a rear end integrally connected with the rear end of the rear fender inner panel section 23 through a rear window frame inner panel section 25.

Figure 4:
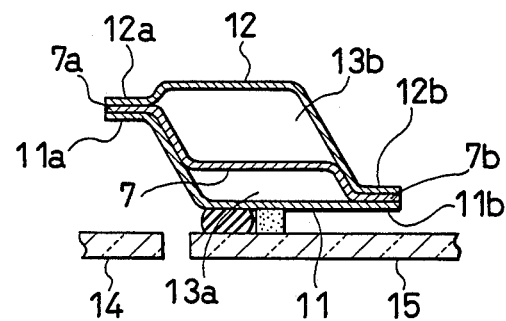
FIG. 4 is a sectional view taken substantially along the line IV–IV in FIG. 3.

The aforementioned panels 1, 9 and 17 are connected together to form an automobile body side structure. In FIG. 2 and 4, it will be noted that the rear pillar outer panel section 11 in the rear side outer panel 9 is laid at the front and rear edge portions 11a and 11b over the front and rear edge portions 7a and 7b of the rear pillar reinforcement panel section 7 in the front side outer panel 1 with a space 13a between the panel sections 11 and 7. The rear pillar inner panel section 12 of the rear side inner panel 17 has a front edge portion 12a and a rear edge portion 12b which are laid respectively over the front and rear edge portions 7a and 7b of the rear pillar reinforcement panel section 7 with a space 13b between the panel sections 7 and 12. The panel sections 7, 11 and 12 are then connected together at the front and rear edge portions by for example spot weldings to form a rear pillar 6 of a closed cross-section.

Figure 3:
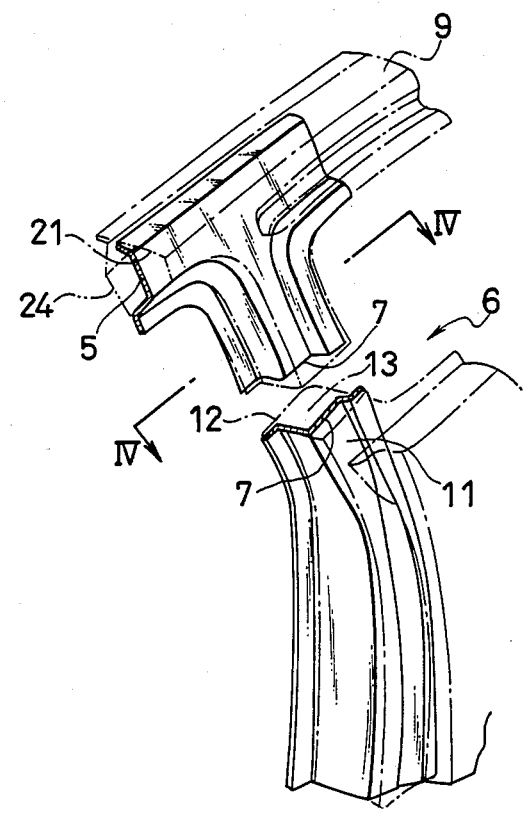
FIG. 3 is a fragmentary perspective view showing the connection between the front and rear side outer panels.

In FIG. 3, it will further be noted that the rear roof rail outer panel section 21 in the rear side outer panel 9 is laid at the front end portion over and welded to the rear end portion of the front roof rail outer panel section 5 in the front side outer panel 1. The panel section 21 is further welded to the rear roof rail inner panel section 4 to form a roof rail of a closed cross-section. Although not shown in the drawings, the rear fender outer panel section 20 in the panel 9 is welded at the upper and lower edge portions to the rear fender inner panel section 23 in the panel 17. Further, the rear window frame outer panel section 22 in the panel 9 is welded at the front and rear edge portions to the rear window frame inner panel section 25 in the panel 17.

In the structure described above, it will be understood that the outer side panel assembly is made of only two panels 1 and 9 so that accumulation of manufacturing errors can be avoided. Since the rear end portion of the front side outer panel 1 is used as a reinforcement for the rear pillar 6, it is possible to obtain an increased rigidity in the rear pillar structure without increasing the number of parts. In FIG. 4, the reference numbers 14 and 15 designate respectively a side door window glass and a rear window glass.

Figure 6:
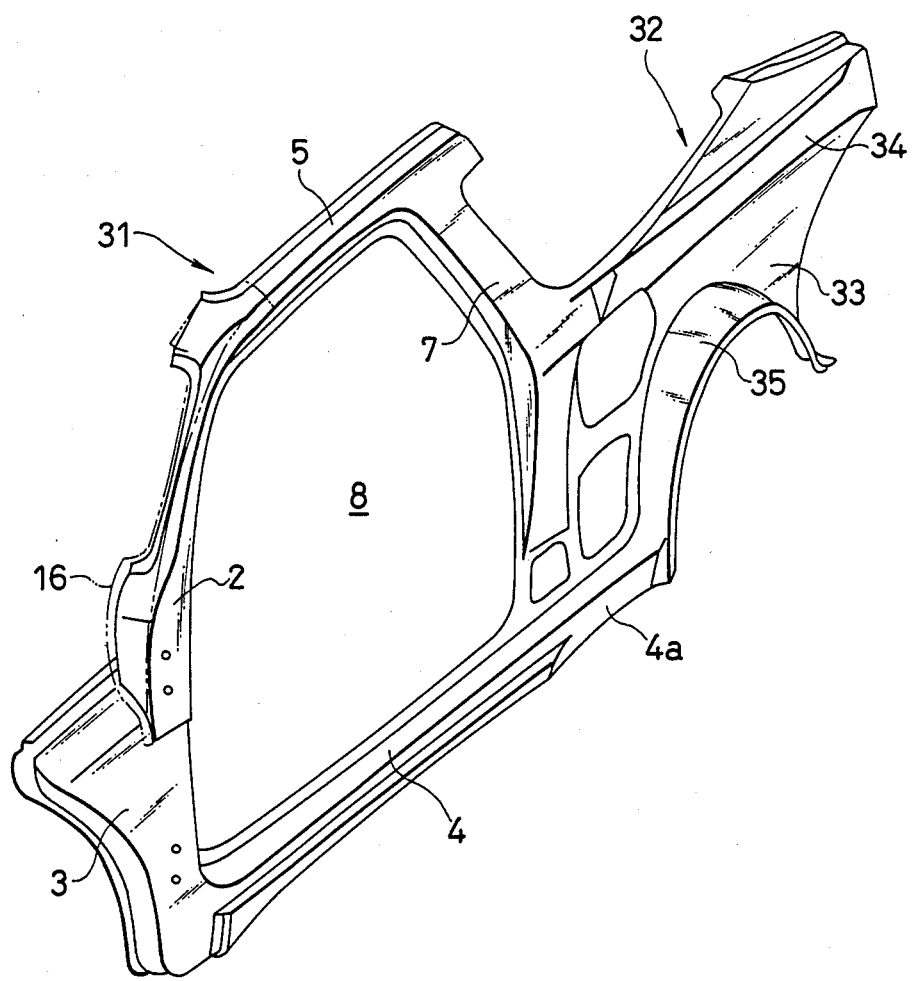
FIG. 6 is a perspective view of a front side outer panel in accordance with another embodiment of the present invention.

Referring now to FIG. 6, there is shown a front side outer panel 31 which includes a front pillar outer panel section 2, a front hinge pillar section 3, a side sill outer panel section 4, a roof rail outer panel 5 and a rear pillar reinforcement panel section 7 which are formed integrally to form a door opening 8 as in the previous embodiment.

The panel 31 is further formed with a rearward extension 32 which extends rearwards from the rear pillar reinforcement panel section 7. The rearward extension 32 includes a rear fender inner panel section 33 which has a lower edge portion formed with a rear side sill reinforcement 4a which continues to a rear wheel house 35. At the upper edge portion of the rear fender inner panel section 33, there is formed a substantially horizontal belt line reinforcement 34.

Figure 8:
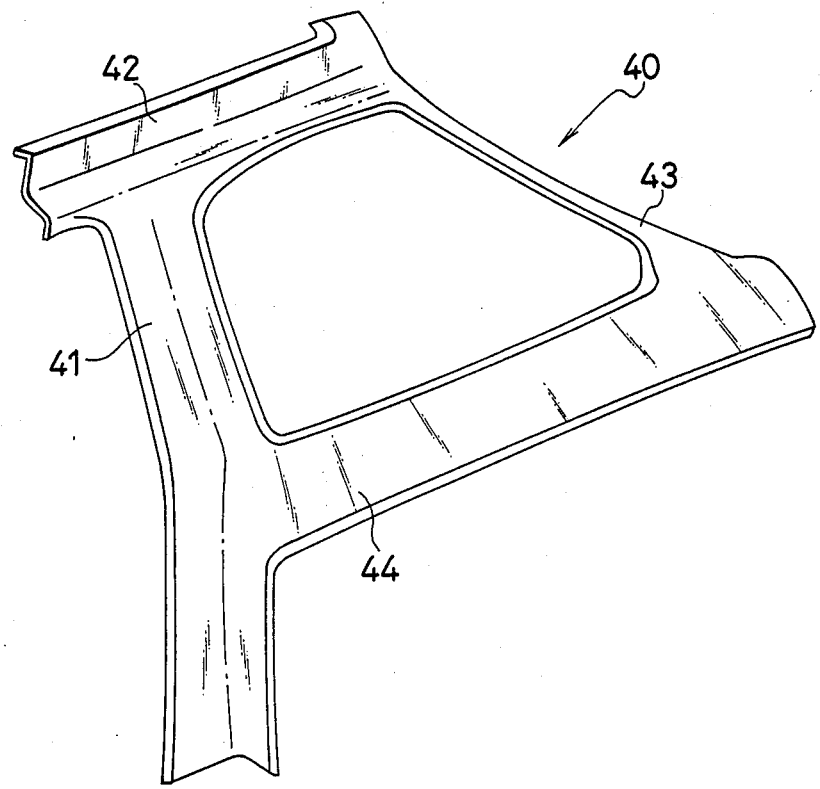
FIG. 8 is a perspective view showing a rear side inner panel.

FIG. 8 shows a rear side inner panel 40 which includes a rear pillar inner panel section 41 extending substantially vertically. At the upper end, the panel section 41 is contiguous with a substantially horizontally extending rear roof rail inner panel section 42 which is in turn contiguous at the rear end with a rear window frame inner panel section 43. The panel 40 further has a belt line inner panel section 44 which is integral with and extends rearward from the intermediate portion of the rear pillar inner panel section 41.

Figure 7:
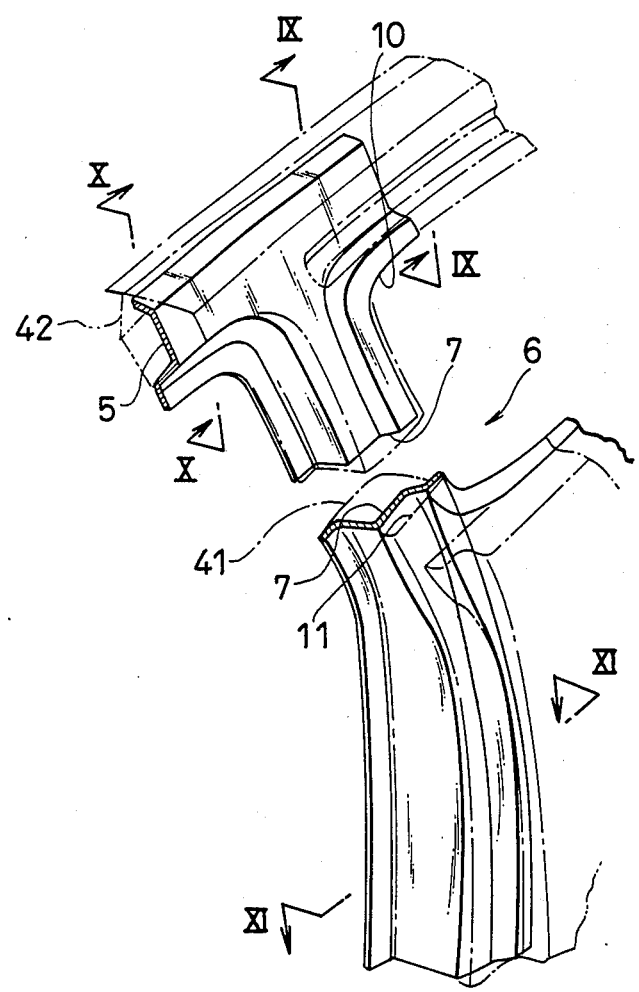
FIG. 7 is a fragmentary perspective view showing the connection between the front and rear side outer panels.
Figure 11:
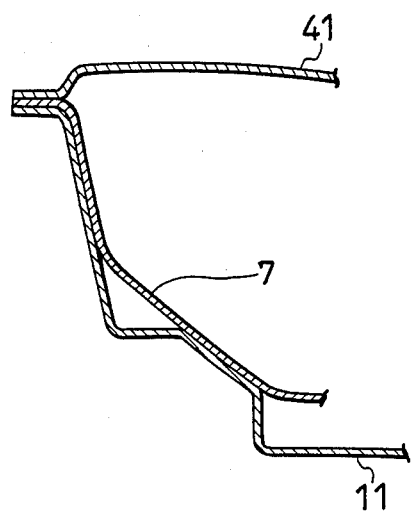
FIG. 11 is a sectional view taken along the line XI—XI in FIG. 7.

The aforementioned panels 31 and 40 are assembled with the rear side outer panel 9 as shown in FIG. 2. FIG. 7 shows the connection at the rear pillar 6. As in the previous embodiment, the rear pillar outer panel section 11 in the panel 9 is laid over the rear pillar reinforcement panel section in the panel 31. Further, the rear pillar inner panel section 41 in the rear side inner panel 40 is laid over the rear pillar reinforcement panel section 7 in the panel 31. The panel sections 11, 7 and 41 are then welded together at the front and rear edge portions to form the rear pillar 6. In the area where the rear window opening 10 is formed, the cross-sectional configuration of the rear pillar 6 is the same as that shown in FIG. 4 in connection with the previous embodiment. In the area where the belt line reinforcement 44 is formed, the sectional configuration is as shown in Figure 11.

Figure 9:
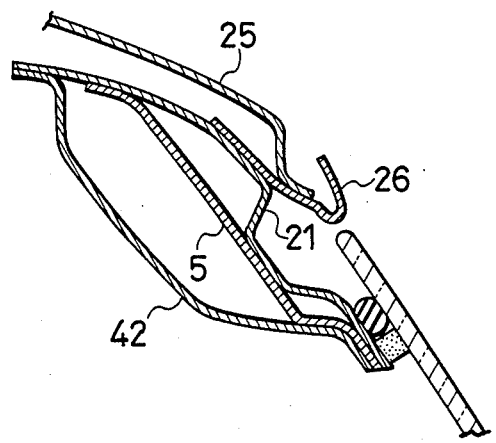
FIG. 9 is a sectional view taken along the line IX—IX in FIG. 7.
Figure 10:
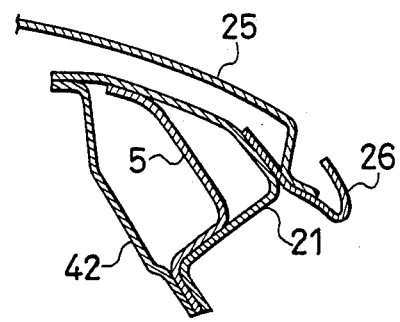
FIG. 10 is a sectional view taken along the line X—X in FIG. 7.

Referring to FIGS. 9 and 10 in addition to FIG. 7, it will be noted that the rear portion of the front roof rail outer panel section 5 in the panel 31 is located laterally inside the front portion of the rear roof rail outer panel section 21 in the panel 9 and welded thereto at the upper and lower edge portions. The rear roof rail inner panel section 42 in the panel 40 is welded at the upper and lower edge portions to the rear roof rail outer panel section 21 in the panel 9 to form a rear roof rail of a closed cross-section. A roof panel 25 and a rain rail 26 are welded to the rear roof rail outer panel section 21.

Figure 12:
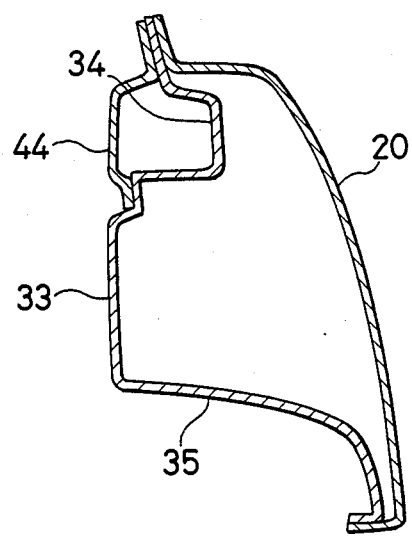
FIG. 12 is a vertical sectional view showing the connection between the rear fender outer panel section and the inner panel section.

The rear window frame outer panel section 22 is welded to the rear window frame inner panel section 43 to form a rear window frame. Referring to FIG. 12, the belt line inner panel section 44 is welded at the upper and lower edges to the belt line reinforcement 34 in the panel 31 and the rear fender outer panel section 20 in the panel 9 is welded at the upper and lower edge portions to the rear fender inner panel section 33 in the panel 31.

The invention has thus been shown and described with reference to specific embodiments, however, it should be noted that the invention is in no way limited to the details of the illustrated structures but changes and modifications maybe made without departing from the scope of the appended claims.

I claim:

1. An automobile body side panel assembly comprising:
    a front side outer panel and a rear side outer panel, said front and rear side outer panels being formed separately from each other,
    said front side outer panel including a front pillar outer panel section having an upper end contiguous with a front end of a roof rail outer panel section and a lower end contiguous with an upper end of a front door hinge panel section, a side sill outer panel section having a front end contiguous with a lower end of said front door hinge pillar panel section, said roof rail outer panel section and said side sill outer panel section having rear ends contiguous with a rear pillar reinforcement panel section extending substantially vertically to define a rear end of a side door opening,
    said rear side outer panel including a rear fender outer panel section having a front end portion contiguous with a substantially vertically extending rear pillar outer panel section which extends along the rear end of said side door opening and defines a front end of a rear window opening, said rear pillar outer panel section being located outside said rear pillar reinforcement panel section, and
    a rear side inner panel including a rear pillar inner panel and a frame defining said rear window opening located rearwardly of said rear pillar inner panel, said rear pillar inner panel being connected at front and rear edge portions to said rear pillar outer panel section and said rear pillar reinforcement panel section, respectively, to form a rear pillar of a closed cross-section, and said rear pillar reinforcement panel section being located so that it divides the closed cross-section of the rear pillar into two closed spaces.

2. An automobile body side panel assembly in accordance with claim 1, wherein said front side outer panel includes a rear fender inner panel section extending rearward from a lower portion of said rear pillar reinforcement panel and adapted to be placed laterally inside said rear fender outer panel section.

3. An automobile body side panel assembly in accordance with claim 2, wherein an upper edge portion of said rear fender inner panel section is formed with a substantially horizontally extending belt line reinforcement, said pillar reinforcement panel being formed integrally with a belt line inner panel section extending rearward from an intermediate portion of said rear pillar reinforcement panel and connected with said belt line reinforcement and an upper edge portion of said rear fender outer panel section in said rear side outer panel.

4. An automobile body side panel assembly in accordance with claim 2, wherein said rear fender inner panel section in said front side outer panel is connected at upper and lower edge portions with upper and lower edge portions of said rear fender outer panel section is said rear side outer panel.

5. An automobile body side panel assembly in accordance with claim 1, wherein said rear side inner panel is located inside said rear side outer panel.

6. An automobile body side panel assembly comprising:
    a front side outer panel and a rear side outer panel, said front and rear side outer panels being formed separately from each other,
    said front side outer panel being formed integrally with a front pillar outer panel section which is integral at an upper end with a roof rail outer panel section and at a lower end with a side sill outer panel section, said roof rail outer panel section and said side sill outer panel section being integral with a substantially vertically extending first rear pillar panel section,
    said rear side outer panel including a rear fender outer panel section and a substantially vertically extending second rear pillar panel section which is located forward of said rear fender outer panel section, one of said first and second rear pillar panel sections providing a rear pillar outer panel section, a substantially vertically extending rear pillar inner panel being connected to said rear pillar outer panel section for form a rear pillar of a closed cross-section, the other of said first and second rear pillar panel sections providing a rear pillar reinforcement dividing the closed cross-section into two parts, said rear pillar inner panel being integral with a roof rail inner panel section extending rearwardly from an upper end of said rear pillar inner panel.

* * * * *